United States Patent
Takano

(10) Patent No.: US 7,485,674 B2
(45) Date of Patent: Feb. 3, 2009

(54) POWDER COATING COMPOSITION

(75) Inventor: Yasushi Takano, Kashihara (JP)

(73) Assignee: Toyo Aluminium Kabushiki Kaisha, Osaka (JP)

(*) Notice: Subject to any disclaimer, the term of this patent is extended or adjusted under 35 U.S.C. 154(b) by 335 days.

(21) Appl. No.: 10/535,701

(22) PCT Filed: Nov. 18, 2003

(86) PCT No.: PCT/JP03/14682

§ 371 (c)(1),
(2), (4) Date: May 19, 2005

(87) PCT Pub. No.: WO2004/048488

PCT Pub. Date: Jun. 10, 2004

(65) Prior Publication Data

US 2006/0014858 A1 Jan. 19, 2006

(30) Foreign Application Priority Data

Nov. 22, 2002 (JP) .............................. 2002-340002

(51) Int. Cl.
C08K 9/00 (2006.01)
C08K 3/08 (2006.01)

(52) U.S. Cl. ........................ 523/204; 523/205; 523/206; 524/441

(58) Field of Classification Search ................. 523/204, 523/205, 206

See application file for complete search history.

(56) References Cited

U.S. PATENT DOCUMENTS

| 3,932,347 A | 1/1976 | Camelon et al. |
| 4,138,511 A | 2/1979 | Rolles et al. |
| 4,180,607 A * | 12/1979 | Sasaki et al. ................ 528/112 |
| 4,507,421 A * | 3/1985 | Symietz ...................... 524/425 |
| 5,319,001 A * | 6/1994 | Morgan et al. .............. 523/205 |
| 5,824,144 A * | 10/1998 | He et al. ..................... 106/403 |
| 2004/0151940 A1 | 8/2004 | Takano et al. |

FOREIGN PATENT DOCUMENTS

| JP | 51-137725 | 11/1976 |
| JP | 52-128927 | 10/1977 |
| JP | 57-016072 A | 1/1982 |
| JP | 08-143788 A | 6/1996 |
| JP | 09-071734 A | 3/1997 |
| JP | 09-291230 A | 11/1997 |
| JP | 2000-204289 A | 7/2000 |
| JP | 2000-219825 A | 8/2000 |
| JP | 2001-139887 A | 5/2001 |
| JP | 2002-105381 A | 4/2002 |
| WO | WO 02/094950 A1 | 11/2002 |

OTHER PUBLICATIONS

Wypych, George. Handbook of Fillers, 2nd Edition. Toronto, ChemTec Publishing, 2000, p. 16. TP1114.W96.*
Full English-language translation of JP 52-128927, Oct. 28, 1977.*

* cited by examiner

Primary Examiner—Vasu Jagannathan
Assistant Examiner—Vickey Ronesi
(74) Attorney, Agent, or Firm—Birch, Stewart, Kolasch & Birch, LLP

(57) ABSTRACT

In order to provide a powder coating composition containing a flake pigment attaining excellent recyclability and coating property as well as improved metallic feel, brilliance, and brightness of a coating film, the powder coating composition contains powder coating particles including thermosetting resin powder, an adhesive binder, and a flake pigment bound to a surface of the thermosetting resin powder by means of the binder. An average particle size of the powder coating particle is not larger than 100 μm based on D50 conversion, and a bonding ratio between the thermosetting resin powder and the flake pigment is in a range from 90% to 100%.

5 Claims, 5 Drawing Sheets

FIG.3 COMPARATIVE EXAMPLE 1 MAGNIFICATION × 300

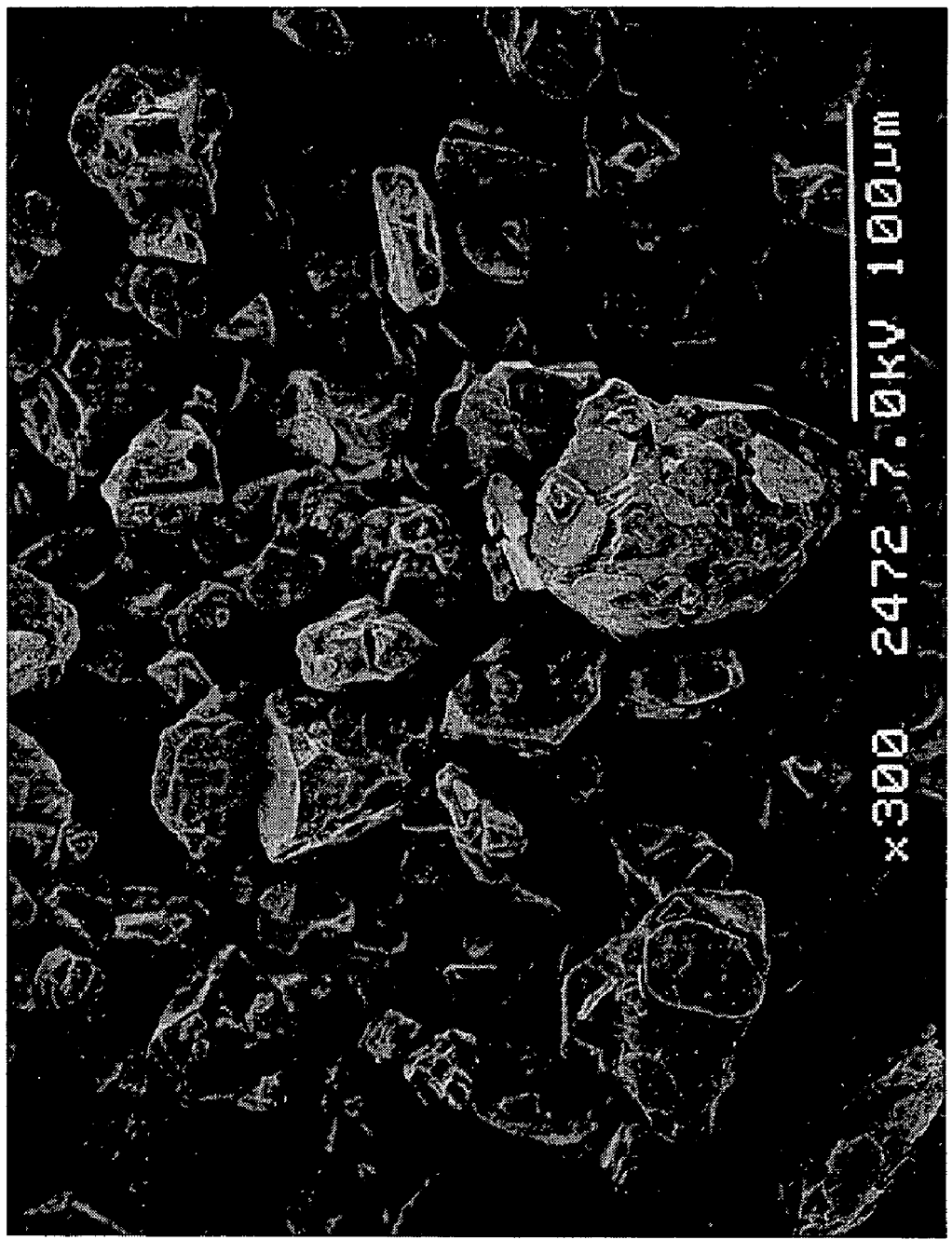
FIG.5 EXAMPLE 1 MAGNIFICATION ×300

POWDER COATING COMPOSITION

TECHNICAL FIELD

The present invention relates to a powder coating composition, and more particularly to a new metallic powder coating composition containing powder coating particles obtained by adhering a flake pigment onto a thermosetting resin powder surface by means of an adhesive binder.

BACKGROUND ART

As a low-pollution coating without using an organic solvent, there has been a growing demand for a powder coating in fields such as automobile parts, electric appliances, furniture, machine tool, business equipment, toys and the like. Coating with the powder coating causes low pollution. In addition, sufficient thickness of the coating film can be achieved by one time application, and it is not necessary to apply coating as many times as in an example using a conventional solvent-type coating. That is, a time period for coating can be shortened. Moreover, as the solvent is not contained in the coating, the powder coating is advantageous in that a pinhole will not be created in the coating film.

In the powder coating with a property as described above, a coating film property is excellent if a metal pigment such as metal flake is not contained, presenting no problem. On the other hand, if a flake metal pigment is contained, following problems will arise.

Examples of a conventional method of metallic coating with a powder coating include: a melt blending method in which a flake pigment is sufficiently mixed and kneaded with a resin or a coloring pigment in advance using a melting method, and thereafter a resultant substance is pulverized by crushing or the like; a dry blending method in which resin powder and a flake pigment are mixed and applied; and a bonded method using resin powder having its surface adhered to a flake pigment (for example, see the specifications of Japanese Patent Laying-Open No. 51-137725, Japanese Patent Laying-Open No. 9-71734, U.S. Pat. No. 4,138,511, and the like).

In the melt blending method, the flake pigment tends to be deformed during the step of mixing and kneading or the subsequent step of controlling a resin powder particle size by crushing, and excellent metallic feel cannot be obtained after coating. In addition, when an aluminum flake pigment is used as the flake pigment, an active surface of aluminum is exposed during crushing, and possibility of ignition, dust explosion or the like will be higher.

In the dry blending method, deformation of the flake pigment is relatively unlikely. On the other hand, as the pigment needs to bear electrical charges during coating, a surface should be coated with a resin in advance, if a metal pigment such as the aluminum flake pigment is used. In addition, as the pigment and the resin powder have different charged rate respectively, a separation phenomenon between the resin powder and the metal pigment takes place during coating, resulting in lower performance in terms of design of the coating film. Further, a ratio of content of the pigment varies before and after application of the powder coating. Therefore, if the coating is recovered for reuse, color tone is altered. This means that recycle of the coating is virtually impossible.

In addition, in the dry blending method, performance in terms of design is impaired even with the aluminum flake pigment that has been coated with resin in advance. Specifically, when powder-coating of the powder coating composition is carried out by using a corona gun, the aluminum flake pigment adheres to a gun nozzle due to static electricity. After the adhered aluminum flake pigment grows to some extent, it is separated, which results in such a spitting phenomenon that an aluminum mass adheres to a plate, i.e., production of a seeding.

The bonded method includes a method of adhering the flake pigment to a resin powder surface with a brush polisher, and a method of transferring and adhering metal flake to the resin powder by causing the resin powder to come in contact with a distributing medium such as an alumina ball covered with the metal flake, and the like. In such bonded methods, the flake pigment and the resin are pressed and adhered by physical stress. Accordingly, deformation of the flake pigment tends to occur, and excellent metallic feel cannot be obtained. In addition, adhesion is not strong. This fact is advantageous in that bonding (blocking) among resin powders is less likely, whereas free particles of the flake pigment that do not adhere to the resin powder considerably remain. If an amount of the free flake pigment increases, a blending ratio of the resin to the flake pigment is varied due to a difference in adhesion efficiency when the coating is recovered for reuse, whereby the coating cannot be reused after it is recovered as in the case of the dry blending. Moreover, if the metal pigment such as the aluminum flake pigment is used, the possibility of ignition or dust explosion becomes higher. Weak adhesion between the resin powder and the flake pigment is noticeable particularly when the flake pigment has a large particle size. Excellent brilliance and high brightness only achieved with the use of such a flake pigment have been difficult to achieve with the bonded aluminum obtained by using these methods.

From the viewpoint described above, development of a powder coating composition containing a flake pigment having excellent recyclability and coating property as well as improved metallic feel, brilliance and brightness of the coating film has strongly been demanded. Such a powder coating composition, however, has not yet been developed.

DISCLOSURE OF THE INVENTION

From the foregoing, a primary object of the present invention is to provide a powder coating composition containing a flake pigment attaining excellent recyclability and coating property as well as improved metallic feel, brilliance and brightness of a coating film.

In order to solve the problems in the conventional art, the present inventors have paid attention to improvement in adhesion between the flake pigment and the resin powder and prevention of bonding among resin powders. As a result of diligent efforts, the present inventors have found that the use of the powder coating composition including powder coating particle obtained by binding the flake pigment to the thermosetting resin powder by means of an adhesive binder and attaining a particle size not larger than 100 µm and a bonding ratio of at least 90% can achieve the above-described object, and completed this invention.

The powder coating composition according to the present invention includes powder coating particle including thermosetting resin powder, an adhesive binder, and a flake pigment bound to a surface of the thermosetting resin powder by means of the binder. The powder coating particle has an average particle size of at most 100 µm based on D50 conversion. A bonding ratio between the thermosetting resin powder and the flake pigment is in a range from 90% to 100%.

The flake pigment may be an aluminum flake pigment including aluminum flake particle and a resin composition coat coating a surface of the aluminum flake particle.

In such a case, the resin composition coat is desirably a resin composition coat containing a three-dimensionally cross-linked polymer resin obtained by polymerizing a raw material composition including at least two types of oligomer and/or monomer having at least one polymeric double bond in a molecule.

In such a case, the aluminum flake pigment preferably contains 2 g to 50 g of the resin composition coat with respect to 100 g of the aluminum flake particle.

Desirably, the adhesive binder is of at least one type selected from a group consisting of a terpene-type resin, a terpene/phenol-type resin, a terpene-type hydrogenated resin, and a terpene/phenol-type hydrogenated resin.

Preferably, the adhesive binder is an oligomer that can be dissolved in a solvent that does not dissolve the thermosetting resin powder, has a number-average molecular weight in a range from 300 to 2000, and has a softening point in a range from 30 to 180° C., and the solvent that does not dissolve the thermosetting resin powder has a boiling point in a range from 28 to 130° C. under an atmospheric pressure.

BRIEF DESCRIPTION OF THE DRAWINGS

FIG. 3 shows a state of adhesion between the aluminum flake pigment and the thermosetting resin, in connection with electron micrographs (magnification of 300 times) of Comparative Example 1 of the present invention.

FIG. 4 shows a state of adhesion between the aluminum flake pigment and the thermosetting resin, in connection with electron micrographs (magnification of 300 times) of Comparative Example 2 of the present invention.

FIG. 5 shows a state of adhesion between the aluminum flake pigment and the thermosetting resin, in connection with electron micrographs (magnification of 300 times) of Example 1 of the present invention.

BEST MODES FOR CARRYING OUT THE INVENTION

Figure 1:
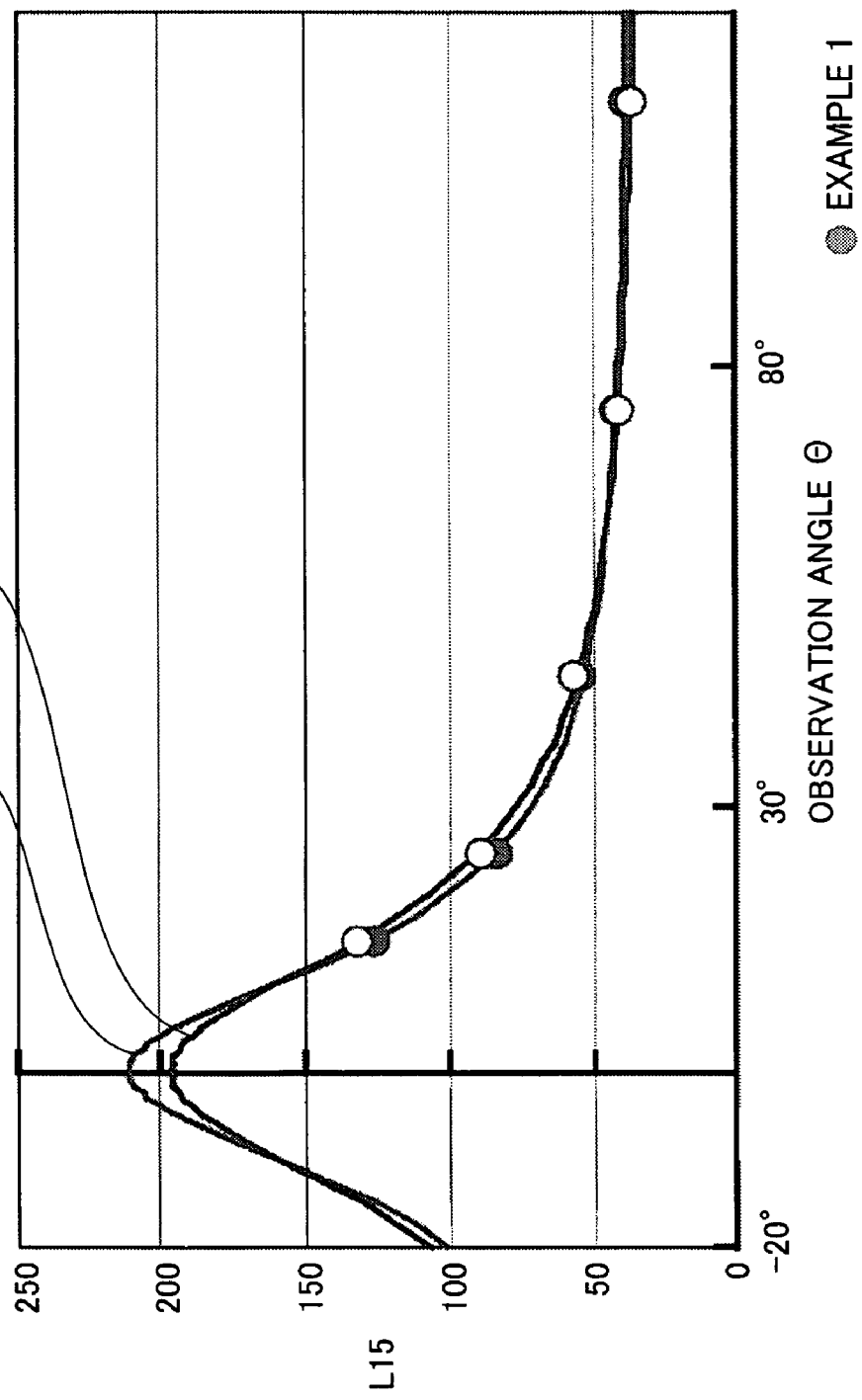
FIG. 1 is a graph illustrating a relation between an L value and an observation angle (θ), of a coating film based on a powder coating composition using bonded aluminum in Example 1 of the present invention, in comparison with Comparative Example 1.

The present invention will be described hereinafter in detail with reference to embodiments.

<Outline of Powder Coating Composition>

The powder coating composition according to the present invention includes powder coating particle including thermosetting resin powder, an adhesive binder, and a flake pigment bound to a surface of the thermosetting resin powder by means of the binder.

The average particle size of the powder coating particle included in the powder coating composition according to the present invention is not particularly limited, however, it is normally set to 10 μm or larger based on D50 conversion. The average particle size is preferably set to 100 μm or smaller based on D50 conversion, and more preferably to 60 μm or smaller in particular.

If the average particle size is smaller than a value in that range, uniform mixing with the flake pigment may be difficult and aggregation is more likely. In such a case, uniform pulverization at the time of powder coating may be impossible. On the other hand, if the average particle size is larger than the value in that range, smoothness of the coating film when it is applied is deteriorated to a level outside a practically tolerable range. That is, performance in terms of design is impaired, or a large number of seedings tend to be produced in the coating film. In addition, if a small amount of aggregated mass is contained in the powder coating composition in spite of the average particle size being not larger than 100 μm based on D50 conversion, the aggregated mass may cause the seeding, and the coating film excellent in terms of design is less likely to be obtained.

A bonding ratio between the thermosetting resin powder and the flake pigment contained in the powder coating composition according to the present invention is naturally 100% or smaller, but preferably it is set to 90% or larger, and more preferably 95% or larger in particular. If the bonding ratio is smaller than a value in this range, a problem particularly in terms of spitting may arise.

Spitting tends to occur particularly in a long-time continuous coating operation (for example, industrial line of coating). If adhesion to the gun nozzle occurs during coating for a short period of time, spitting substantially inevitably occurs during long-time continuous coating. It is only the aluminum flake pigment that adheres to the gun nozzle due to static electricity, and the thermosetting resin powder hardly adheres thereto. Therefore, if most of the aluminum flake pigment is bound to the thermosetting resin powder, the aluminum flake pigment hardly adheres to the gun nozzle, and occurrence of spitting is suppressed to a negligible level.

A method of binding the flake pigment to the surface of the thermosetting resin powder by means of a binder has conventionally been known (for example, see Japanese Patent Laying-Open No. 52-128927). This document, however, does not mention whether or not mixing and kneading in the drying step is necessary. According to the example, stationary vacuum drying is performed.

Therefore, according to the method in this document, an aggregated mass is generated, although hardness thereof may be varied. If the aggregated mass is used as the powder coating composition, the generated aggregated mass should be broken, because the preferable average particle size based on D50 conversion is normally 60 μm or smaller.

In breaking the generated aggregated mass, if the aggregated mass is soft, it is possible to break the aggregated mass under a relatively soft condition (for example, natural breakage on a screen). In order to obtain a soft aggregated mass, however, a condition sacrificing bonding between the flake pigment and the thermosetting resin powder should be selected, which results in lower bonding ratio between the flake pigment and the thermosetting resin powder.

In contrast, in order to achieve strong bonding between the flake pigment and the thermosetting resin powder, the aggregated mass will have high hardness and such a less soft condition as breakage with the use of a crusher is necessary (according to the example of the document mentioned above, the aggregated mass is crushed with the use of a crusher in all cases). If a crusher or the like is used, the flake pigment and the thermosetting resin powder once bound to each other are separated due to the impact, which again results in lower bonding ratio between the flake pigment and the thermosetting resin powder.

In any case, the method described in the document above cannot obtain a powder coating composition attaining a high bonding ratio between the thermosetting resin powder and the flake pigment and including powder coating particle having a particle size suitable for powder coating, as in the case of the powder coating composition according to the present invention.

<Flake Pigment>

Examples of the flake pigment used for the powder coating composition according to the present invention include metal flake such as aluminum, zinc, copper, bronze, nickel, titanium, or stainless steel, and alloy flake thereof. Among those pigments, the aluminum flake pigment is particularly suitable because it has excellent metallic luster, and is inexpensive and easy to handle by virtue of its small specific gravity.

Preferably, the aluminum flake pigment normally has an average particle size of approximately 1 to 100 μm, and more preferably of 3 to 60 μm. Preferably, the aluminum flake pigment normally has an average thickness of approximately 0.01 to 5 μm, and more preferably of 0.02 to 2 μm. In addition, it is particularly preferable for the aluminum flake pigment to have a shape factor, obtained by dividing the average particle size by the average thickness, in a range of approximately 5 to 100.

If the average particle size is over 100 μm, the flake pigment protrudes from the coating film surface, and smoothness or reflection performance of the coating surface tends to be deteriorated. On the other hand, if the average particle size is smaller than 1 μm, metallic feel or brilliance tends to be deteriorated. If the average thickness is over 5 μm, smoothness or reflection performance of the coating surface tends to be deteriorated, as well as cost for manufacturing may be increased. If the average thickness is smaller than 0.01 μm, not only the strength tends to be lowered but also working during manufacturing step may be made difficult.

The average particle size of the flake pigment is found by calculating an average volume from particle size distribution measured by a known method of measuring particle size distribution such as laser diffractometry, micromesh sieve, or Coulter counter.

An agent assisting crushing and flattening added in crushing and flattening may be adsorbed on the surface of the aluminum flake pigment. Examples of such an agent include fatty acid (oleic acid, stearic acid), aliphatic amine, aliphatic amide, aliphatic alcohol, ester compound, and the like. These agents are effective in suppressing unnecessary oxidization of the surface of the aluminum flake pigment so as to improve luster thereof.

An amount of adsorption of the agent is preferably less than 2 parts by mass with respect to 100 parts by mass of the aluminum flake pigment. If the amount is equal to or larger than 2 parts by mass, the surface luster may be deteriorated.

In order to add a variety of colors to the flake pigment, a variety of coloring agents or coloring pigments can be adhered to the surface of the flake pigment. Examples of such coloring agents or coloring pigments include quinacridon, diketopyrrolopyrrole, isoindolinone, indanthrone, perylene, perynone, anthraquinone, dioxazine, benzoimidazolone, triphenylmethane quinophthalone, anthrapyrimidine, chrome yellow, pearl mica, transparent pearl mica, colored mica, interference mica, phthalocyanine, phthalocyanine halide, azo pigment (azomethine metal complex, condensed azo etc.), titanium oxide, carbon black, iron oxide, copper phthalocyanine, condensed polycyclic pigment, and the like.

Though a method of adhering the coloring pigment to the flake pigment is not particularly limited, a method of adhering the coloring pigment to the flake pigment by coating the coloring pigment with a dispersant, followed by stirring and mixing the coloring pigment with the flake pigment in a nonpolar solvent is preferably used.

Examples of the dispersant to be used include aromatic carboxylic acid such as benzoic acid, vinyl benzoate, salicylic acid, anthranilic acid, m-aminobenzoic acid, p-aminobenzoic acid, 3-amino-4-methylbenzoic acid, 3,4-diaminobenzoic acid, p-aminosalicylic acid, 1-naphthoic acid, 2-naphthoic acid, naphtenic acid, 3-amino-2-naphthoic acid, cinnamic acid, and aminocinnamic acid; amino compound such as ethylenediamine, trimethylenediamine, tetramethylenediamine, pentamethylenediamine, hexamethylenediamine, 1,7-diaminoheptane, 1,8-diaminooctane, 1,10-diaminodecane, 1,12-diaminododecane, o-phenylenediamine, m-phenylenediamine, p-phenylenediamine, 1,8-diaminonaphthalene, 1,2-diaminocyclohexane, stearylpropylenediamine, N-β-(aminoethyl)-γ-aminopropyltrimethoxysilane, and N-β-(aminoethyl)-γ-aminopropylmethyldimethoxysilane; and aluminum or titanium chelate compound.

Similarly, in order to add a variety of colors to the flake pigment, an interference coat can be formed on the surface of the flake pigment. The method thereof is not particularly limited. For example, in order to form an optical interference oxide coat on the surface of individual particles of the metal flake, a method of forming an air oxide coat on the surface by heating the metal flake to approximately 300 to 700° C. in an atmosphere where an amount of oxygen is controlled, or a method of coating the flake metal pigment with a precursor of an oxide of transition metal or the like followed by heating and decomposing is preferably used.

In addition, in order to provide chemical resistance, water resistance or weather resistance to the flake pigment, a resin layer can also be formed on the surface of the flake pigment. That is, the flake pigment may be an aluminum flake pigment including aluminum flake particles and a resin composition coat coating a surface of the aluminum flake particle.

Though the method is not particularly limited, a method of precipitating a three-dimensionally cross-linked polymer on the surface of the metal flake by polymerizing an oligomer and/or a monomer by adding a raw material composition containing at least two types of oligomer and/or monomer having at least one polymeric double-bond to a slurry where the metal flake is dispersed in an organic solvent and by adding thereto a polymerization initiator such as azobisisobutyronitrile or benzoyl peroxide while heated in an inert gas atmosphere is preferable.

Here, the resin composition coat is desirably a resin composition coat containing a three-dimensionally cross-linked polymer resin obtained by polymerizing a raw material composition including at least two types of oligomer and/or monomer having at least one polymeric double bond in a molecule. In order to obtain the three-dimensionally cross-linked polymer resin, it is particularly preferable to use monomer or oligomer at least one of which has at least two double bonds in a molecule.

Examples of the polymeric oligomer or monomer to be used include acrylic acid, methacrylic acid, methyl methacrylate, acrylic ester (butyl acrylate, 2-ethylhexyl acrylate, lauryl acrylate, stearyl acrylate, cyclohexyl acrylate, 2-hydroxyethyl acrylate, 2-hydroxybutyl acrylate, 2-methoxyethyl acrylate, 2-diethylaminoethyl acrylate, 1,4-butanediol diacrylate, 1,6-hexanediol diacrylate, 1,9-nonanediol diacrylate, neopentylglycol diacrylate, tripropyleneglycol diacrylate, tetraethyleneglycol diacrylate, trimethylolpropane triacrylate, tetramethylolmethane tetraacrylate, pentaerythritol triacrylate, ditrimethylolpropane tetraacrylate, or the like), methacrylic ester (methyl methacrylate, butyl methacrylate, octyl methacrylate, 1,4-butanediol dimethacrylate, 1,6-hexanediol dimethacrylate, 1,9-nonanediol dimethacrylate, neopentylglycol dimethacrylate, tripropyleneglycol dimethacrylate, tetraethyleneglycol dimethacrylate, trimethylolpropane trimethacrylate, tetramethylolmethane tetramethacrylate, pentaerythritol trimethacrylate, ditrimethylolpropane tetramethacrylate, or the like), trisacryloxyethyl phosphate, styrene, α-methylstyrene, divinylbenzene, acrylonitrile, methacrylonitrile, vinyl acetate, vinyl propionate, maleic acid, crotonic acid, itaconic acid, polybutadiene, linseed oil, soybean oil, epoxidized soybean oil, epoxidized polybutadiene, cyclohexenevinyl monoxide, divinylbenzene monoxide, and the like.

Among these, acrylic acid, methacrylic ester, and acrylic ester are preferably used, because a coat attaining transparency, adhesiveness, weather resistance, and chemical resistance is formed. Divinylbenzene is preferably used, because corrosion resistance is further improved as a result of crosslinking effect. Epoxidized polybutadiene is preferably used in order to improve polymerization reaction efficiency and secondary adhesion.

Here, if the flake pigment is the aluminum flake pigment, an amount of the resin composition coat (herein also referred to as a resin coat) to be formed on the surface of the aluminum flake pigment with respect to 100 g aluminum flake pigment (herein also referred to as a resin coat amount) is preferably set to 2 g or larger, and more preferably to 5 g or larger in particular. In addition, the resin coat amount is preferably set to 50 g or smaller, and more preferably to 40 g or smaller in particular.

If the resin coat amount is set to less than 2 g, an effect of the resin coat such as weather resistance and chemical resistance cannot be obtained, and such a phenomenon that a non-bonding aluminum flake pigment returns to the gun along electric field occurs. As the resin coat amount is increased, an effect of the binder becomes weaker, and the bonding ratio is lowered under the same condition. If the resin coat amount exceeds 50 g, a condition of the bonding ratio not smaller than 90% cannot be satisfied.

As a flake pigment, mica, surface colored mica, glass flake, surface colored glass flake, pearl, or the like may be used alone or in combination with the metal flake.

<Adhesive Binder>

As an adhesive binder is preferably used as dissolved in a solvent, the binder preferably has such properties that it is completely dissolved in a solvent, has a low viscosity when dissolved in the solvent, and loses adhesiveness if the solvent is removed in view of the necessity of suppressing blocking.

An example of the adhesive binder having such a property includes a resin containing an oligomer as a main component which has the number-average molecular weight and the softening point both in a specific range.

Here, the number-average molecular weight is preferably not smaller than 300, and more preferably not smaller than 400 in particular. In addition, the number-average molecular weight is preferably not larger than 2000, and more preferably not larger than 1500 in particular. If the number-average molecular weight is less than 300, the binder becomes a liquid at a room temperature, and blocking takes place among bonded thermosetting powder coating resins, resulting in a defect. If the number-average molecular weight is over 2000, viscosity of the solution when the binder is dissolved in the solvent is increased, and uniform permeation and dispersion into the thermosetting powder coating resin to be subjected to bonding tends to be difficult.

The softening point described above is preferably not lower than 30° C., and more preferably not lower than 80° C. in particular. In addition, the softening point is preferably not higher than 180° C., and more preferably not higher than 150° C. in particular. If the softening point is lower than 30° C., the binder exhibits adhesiveness at a room temperature, and blocking takes place among bonded thermosetting powder coating resins, resulting in a defect. If the softening point is over 180° C., viscosity of the solution when the binder is dissolved in the solvent is increased as in the case of the number-average molecular weight, and uniform permeation and dispersion into the thermosetting powder coating resin to be subjected to bonding tends to be difficult.

Examples of the adhesive binder include an adhesive binder of a natural resin type such as a chromane/indene-type resin, a terpene-type resin, a terpene/phenol-type resin, an aromatic hydrocarbon denatured terpene-type resin, a terpene-type hydrogenated resin, a terpene/phenol-type hydrogenated resin, a rosin-type resin, a hydrogenated rosin ester-type resin, a rosin denatured phenol-type resin, and an alkylphenol-type resin; an adhesive binder of synthetic resin-type such as an alkylphenol/acetylene-type resin, an alkylphenol/formaldehyde-type resin, a styrene-type resin, an aliphatic petroleum resin, an alicyclic petroleum resin, a copolymer-type petroleum resin, an aromatic petroleum resin, a xylene-type resin, and a xylene/formaldehyde-type resin; an oligomer-type tackifier such as polybutene and liquid rubber; and the like. In addition, a variety of rubber materials, fat and oil, wax, and the like can be suitably used as an adhesive binder.

Among the above, a terpene-type resin, a terpene/phenol-type resin, a terpene-type hydrogenated resin, a terpene/phenol-type hydrogenated resin, and the like are particularly suitable for use as an adhesive binder.

<Thermosetting Resin Powder>

The thermosetting resin powder is broadly categorized as an acrylic resin type and a polyester resin type. Other than those two types, examples of the thermosetting resin powder include alkyd resin type, urea resin type, melamine resin type, phenol resin type, ebonite type, and the like. The polyester resin type includes a resin hardened by epoxy resin, a resin hardened by isocyanate (urethane type), and a resin hardened by Primid (Primid type). In the present invention, it is desirable to use at least one of these thermosetting resins.

A hardener or a dispersant may be added to the thermosetting resin powder, if necessary. The hardener is not particularly limited, and a known or commercially available hardener may be used. For example, amine, polyamide, dicyandiamide and its homologue, imidazole and its homologue, dihydrazide carboxylate, acid anhydride, polysulfide, boron trifluoride, amino resin, triglycidyl isocyanurate, trisepoxypropyl isocyanurate, Primid, epoxy resin, other dibasic acid and its homologue, imidazoline and its homologue, hydrazide and its homologue, isocyanate compound, or the like is desirably used. An accelerator may concurrently be used, as required. The dispersant is not particularly limited, and a known or commercially available dispersant may be used. For example, a known surfactant such as phosphoric ester and its homologue, amine and its homologue, polyoxyethylene alkylether, polyoxyethylene alkylphenylether and its homologue, or the like is preferably used.

In addition, a variety of coloring agents such as quinacridon, diketopyrrolopyrrole, isoindolinone, indanthrone, perylene, perynone, anthraquinone, dioxazine, benzoimidazolone, triphenylmethane quinophthalone, anthrapyrimidine, chrome yellow, pearl mica, transparent pearl mica, colored mica, interference mica, phthalocyanine, phthalocyanine halide, azo pigment (azomethine metal complex, condensed azo etc.), titanium oxide, carbon black, iron oxide, copper phthalocyanine, condensed polycyclic pigment, or the like may be contained in the thermosetting resin powder. When the coloring agent is contained, more bright-colored metallic coating film can be obtained. Though an amount of blending of the coloring agent is different depending on the type thereof, it is desirable to set the amount to be in such a range that a property of the flake pigment according to the present invention is made use of, and smoothness or reflection performance of the coating film surface is not deteriorated.

In addition, a variety of fillers such as bentonite, alumina white, calcium carbonate, barium sulfate, or talc; a variety of fluidity adjusters such as silica, alumina, or aluminum hydroxide; a variety of fluidizers such as acrylic oligomer or silicone; a variety of foaming preventing agents such as benzoin; or a variety of additives and functional materials including waxes, coupling agent, antioxidant, magnetic powder, stabilizer, UV absorber, leveling agent, thickening agent, or precipitation preventing agent may be contained in the thermosetting resin powder, as required.

Though the average particle size of the thermosetting resin powder is not particularly limited, preferably, it is normally set to approximately 5 to 100 μm, and particularly preferably to 15 to 60 μm. If the average particle size is smaller than 5 μm, it will be difficult to uniformly mix the resin powder with the pigment and aggregation is likely, whereby uniform pulverization may not be achieved in powder coating. If the average particle size is over 100 μm, smoothness of the coating film surface is deteriorated, and excellent appearance may not be obtained.

The thermosetting resin powder is manufactured in the following manner. For example, first, raw material composition containing a resin, a hardener, a filler added as required, or the like is prepared and subjected to dry blending, using a mixer, a blender, or the like. After mixing, the materials are melted, and mixed and kneaded with a kneader, followed by cooling. Then, a mechanical or air crusher is used to crush the cooled, melted, mixed and kneaded substance, which is subsequently classified by an air classifier so as to obtain the thermosetting resin powder. Other than this method, a spray dry method or a polymerization method may be used to manufacture the thermosetting resin powder.

<Bonding Between Thermosetting Resin Powder and Flake Pigment>

A method of binding the flake pigment to the surface of the thermosetting resin powder obtained by the method described above using the adhesive binder is not particularly limited, and the following method may be employed, for example.

An adhesive binder dissolved in a solvent is added to the resin powder and the flake pigment uniformly mixed in advance, followed by mixing and kneading. Mixing and kneading is continued until the solvent evaporates and the entire mixture becomes powdery. After the solvent is completely removed, the mixture is classified by an air classifier (screen), so as to obtain a powder coating composition for metallic coating. By evaporating and removing the solvent for drying the mixture while mixing and kneading the same, bonding between the flake pigment and the resin powder is strengthened, and blocking among the resin powders can be suppressed. It is to be noted that vacuuming is more preferable for drying the mixture by evaporating and removing the solvent.

In the step of mixing and kneading including drying, the mixture is kept at a temperature not lower than −5° C., and more preferably not lower than 0° C. in particular. In addition, the mixture is kept at a temperature not higher than 50° C., and more preferably not higher than 35° C. in particular. If the temperature exceeds 50° C., bonding among the thermosetting resin powders by means of the binder is promoted, leading to a possibility of occurrence of blocking. In such a case, though the aggregated particles can be separated with a physical crushing method such as jet mill, the flake pigment particles may peel off from the thermosetting resin powder and the particles themselves may be destroyed in such a process, which could lead to a result contrary to the original object. If the temperature is lower than −5° C., it takes a long time for drying, which is not practical.

Though the step of uniformly mixing the flake pigment with the resin powder and the subsequent step of mixing and kneading as well as drying the adhesive binder can continuously be performed in an identical apparatus such as a vacuum kneader mixer, the step of uniform mixing and the step of mixing, kneading, and drying of the binder may be performed separately in order to improve productivity. In such a case, a high-speed mixer such as an atmospheric pressure kneader mixer, a two-axis screw type kneader mixer, a Henschel mixer, or a super mixer, or a blender may be used as a mixer. A vibration dryer, a continuous fluidized-bed dryer, or the like may be used as a kneader mixer and dryer.

A mixture obtained by dispersing the flake pigment in the adhesive binder dissolved in the solvent in advance may be added to the resin powder, and the solvent may then be evaporated while mixing and stirring.

Though the solvent dissolving the adhesive binder is not particularly limited, the solvent should not dissolve or swell the resin powder, and desirably it has a low boiling point. In general, the thermosetting resin powder for powder coating melts at 50° C. to 80° C., and accordingly, a solvent having a low boiling point which can be distilled and removed at a temperature lower than the melting temperature of the thermosetting resin powder is preferable. In addition, a solvent which can completely be removed at a temperature in a range from −5 to 50° C., which is a temperature preferable for mixing, kneading and drying under vacuum, and more preferably at a temperature in a range from 0 to 35° C. is particularly desirable.

As a solvent that meets this requirement, a solvent having a boiling point in a specific range under an atmospheric pressure is preferable. Here, the boiling point is preferably not lower than 28° C., and more preferably not lower than 60° C. in particular. In addition, the boiling point is preferably not higher than 130° C., and more preferably not higher than 110° C. in particular.

If the boiling point of the solvent is over 130° C., drying at a temperature over 50° C. is necessary even under vacuum, and blocking among particles tends to occur. In contrast, if the boiling point of the solvent is lower than 28° C., a flash point of the solvent will also be lowered, which is a problem in terms of safety.

Examples of such a solvent include alkane and its homologue such as pentane, hexane, heptane, and octane; isoparaffin and its homologue such as isopentane, isohexane, isoheptane, and isooctane; alcohol and its homologue such as methanol and ethanol; organic halide and its homologue such as carbon tetrachloride; and water.

The flake pigment mixed with the resin powder may be blended so as to normally attain approximately 1 to 40 parts by mass, in particular 2 to 20 parts by mass per 100 parts by mass of the resin powder. The flake pigment less than 1 part by mass may not be able to achieve sufficient metallic feel and brilliance. In addition, coating thickness should be large in order to cover a base material. If the flake pigment is blended by an amount over 40 parts by mass, the cost for manufacturing is increased and smoothness of the coating film is lost, resulting in poor appearance.

An amount of the adhesive binder to be added is preferably set to 0.1 to 5% with respect to the powder coating composition to be obtained. If the amount is set to less than 0.1%, sufficient bonding is not established and a large amount of free flake pigment will remain. If the amount is over 5%, considerable blocking will take place.

Though an amount of the solvent dissolving the binder is not particularly limited, the amount is preferably set to 2 to 50% of mixed wet powder (resin powder+flake pigment+adhesive binder+solvent), and more preferably to 3 to 20% thereof. If the amount of the solvent is set to less than 2%, it is difficult to uniformly mix the binder solution with the entire resin powder and flake pigment. If the amount thereof is over 20%, blocking occurs to some extent. Further, if the amount is over 50%, fluid slurry is produced, which makes drying difficult.

<Application of Powder Coating Composition>

As a method of applying the powder coating composition according to the present invention, the following process steps are preferable. That is, a blast treatment is performed on the coating surface in advance, and thereafter a known treatment such as conversion treatment is performed. Then, the powder coating composition is adhered, followed by heating and hardening.

Though a member to be coated (base material) is not particularly limited, a member which is not susceptible to deformation or quality change due to baking is preferable. For example, a known metal such as iron, copper, aluminum or titanium and a variety of alloys are preferable. Specific examples include a car body, office products, housewares, sporting goods, building materials, electric appliances, and the like.

As a method of adhering the powder coating composition according to the present invention to the base material surface, fluidized-bed coating or electrostatic powder coating can be applied. Here, the electrostatic powder coating is more preferable because of its excellent coating and adhesion efficiency. A known method such as corona discharge or triboelectrification can be used as a method of electrostatic powder coating.

A heating temperature can be set as required in accordance with a type of the used thermosetting resin powder, and normally it is set to 120° C. or higher, and preferably to 150 to 230° C. A heating time may be selected as required in accordance with the heating temperature, and it is generally set to one minute or longer, and preferably to 5 to 30 minutes. Though not limited, the coating film formed by heating normally has a thickness of approximately 20 to 100 μm.

In the present invention, brightness of the coating film is evaluated by an evaluation parameter $\beta/\alpha$. In a case of a silver metallic coating film using the aluminum flake pigment as the flake pigment and not containing the coloring pigment or the like, it is desirable to attain $\beta/\alpha \geqq 110$. This evaluation parameter $\beta/\alpha$ can be derived from Equation (1) in the following.

$$L = [\beta/(\theta^2 + \alpha)] + \gamma \qquad \text{Equation (1):}$$

(where L represents a lightness index (L*a*b* colorimetry system (a colorimetric system based on uniform color space defined by CIE in 1976)), obtained by colorimetry at an observation angle θ using a spectrophotometer ("X-Rite MA68" manufactured by X-Rite); θ represents an observation angle; and α, β and γ are constants.) The first term in Equation (1) corresponds to directional scattering specific to metallic dependent on observation angle θ, and the second term corresponds to isotropic scattering not dependent on observation angle θ. As visual brightness correlates well to an L value at a position of regular reflection (θ=0) of directional scattering, that is, to $\beta/\alpha$, $\beta/\alpha$ is used as the evaluation parameter of the brightness.

In calculating $\beta/\alpha$, α, β and γ should initially be determined. In the present invention, first, L values actually measured at observation angles θ of 15, 25, 45, 75 and 110 degrees are found respectively. Then, assuming that a relation between θ and the L value is in accordance with Equation (1), α, β and γ are determined with a method of least squares.

FIG. 1 is a graph illustrating a relation between an L value and an observation angle (θ), of a coating film based on a powder coating composition containing the powder coating particle in Example 1 which will be described later, in comparison with Comparative Example 1 which will be described later. Here, α, β and γ are found such that the actually measured value is found as closely as possible to a curve drawn according to Equation (1). For this purpose, an operation in the following is performed. That is, the mantissa is substituted into α, β and γ, and solutions for α, β and γ minimizing residual sum of squares of a calculated value and the actually measured L value are determined by a solver.

In the following, the present invention will be described in more detail with reference to examples, however, it is noted that the present invention is not limited thereto.

Here, a comparative example has been given based on the example shown in Japanese Patent Laying-Open No. 52-128927. This comparative example is different from the example in the document in that a common, commercially available product was used for the thermosetting resin powder and that a resin coat aluminum powder (PCF) manufactured by Toyo Aluminum K.K. was used as the aluminum flake pigment coated with the resin composition coat.

It is noted that Comparative Example 1 is given based on Example 4 of the document mentioned above, and that Comparative Example 2 is given based on Example 1 of the document mentioned above. In addition, in Example 1, the same aluminum flake pigment and the same thermosetting resin powder in the same blending amount as in the Comparative Example were used.

COMPARATIVE EXAMPLE 1

Initially, 50.0 g of Teodur PE 785-900 (manufactured by Kuboko Paint Co., Ltd.) which is thermosetting resin powder was sufficiently dry-blended with 5.0 g of PCF 7601 (manufactured by Toyo Aluminum K.K., an aluminum flake pigment having a resin composition coat obtained by polymerizing acrylic acid, acrylic ester, epoxidized polybutadiene, and divinylbenzene) which is the resin coat aluminum powder. Thereafter, the resultant blend was charged to a high-speed blender (manufactured by PHONIX, volume 200 ml, sealed glass bottle type).

Thereafter, 1.5 g of acetone was dropped, spending approximately three minutes. Here, attention was paid not to drop acetone on the same spot. Dropping was performed in such a manner that dry powders were poured over wet acetone mass while lightly mixing the same. After three minutes of blending, rotating blades were removed from the bottle, each one of which was placed in a vacuum desiccator and subjected to vacuum drying for one hour at a room temperature and at a pressure of 2 kPa. Here, 1.1 g of the blend fixed and adhered to the rotating blade.

When a sample was observed, an aggregated mass was found in the bottle, however, the aggregated mass was soft. Therefore, the aggregated mass was put through a screen of 100 μm mesh. A ratio of passage through the screen was 87% (yield 85%). The average particle size of the powder coating particle contained in the obtained powder coating composition based on D50 conversion was 49 μm, and the bonding ratio of the aluminum flake pigment in the powder coating composition was 21%.

COMPARATIVE EXAMPLE 2

Initially, 50.0 g of Teodur PE 785-900 (manufactured by Kuboko Paint Co., Ltd.) which is the thermosetting resin powder was sufficiently dry-blended with 5.0 g of PCF 7601 (manufactured by Toyo Aluminum K.K.) which is the resin coat aluminum powder. Thereafter, the resultant blend was charged to a high-speed blender (manufactured by PHONIX, volume 200 ml, sealed glass bottle type).

Then, a resin solution was prepared by dissolving 2.0 g of Teodur PE in 10.0 g of dichloromethane. The resin solution of an amount of 1.5 g was dropped, spending approximately thirty seconds. Here, attention was paid not to drop the solution on the same spot. Dropping was performed in such a manner that dry powders were poured over wet mass of the solution while lightly shaking the same. After three minutes of blending, rotating blades were removed from the bottle, each one of which was placed in a vacuum desiccator and subjected to vacuum drying for one hour at a room temperature and at a pressure of 2 kPa. Here, 5.5 g of the blend fixed and adhered to the rotating blade. The powder coating composition that was taken out was crushed by using a rotor speed mill (manufactured by Fritsch). The obtained powders were further put through a screen of 100 μm mesh. A ratio of passage through the screen was 98% (yield 88%). The average particle size of the powder coating particle contained in the obtained powder coating composition based on D50 conversion was 32 μm, and the bonding ratio of the aluminum flake pigment in the powder coating composition was 2%.

COMPARATIVE EXAMPLE 3

Initially, 50.0 g of Teodur PE 785-900 (manufactured by Kuboko Paint Co., Ltd.) which is the thermosetting resin powder was sufficiently dry-blended with 5.0 g of PCF 7601 (manufactured by Toyo Aluminum K.K.) which is the resin coat aluminum powder in a stainless beaker having a 1-liter volume. Thereafter, 3.0 g of acetone and 30.0 g of normal heptane (boiling point of 98.4° C.) were mixed and added to the blend.

Here, acetone is a solvent dissolving Teodur, while normal heptane is a solvent not dissolving the same. In other words, normal heptane serves as an agent uniformly distributing acetone in the blend.

Then, the blend was stirred by means of a spoon so as to achieve a uniform state, and thereafter the blend was placed in a vacuum desiccator and subjected to vacuum drying for one night at a room temperature and at a pressure of 2 kPa. When a sample was observed, the whole blend turned to a hard aggregated mass. Therefore, the aggregated mass was crushed with a hammer to a size allowing passage through a powder coating apparatus. The measured average particle size of the obtained powder coating composition based on D50 conversion was 230 μm. Measurement of the bonding ratio was impossible, because the particles were too coarse to be applied on art paper with a doctor blade. Though powder coating was attempted using the obtained powder coating composition, a large number of seedings were created on the plate and a smooth coating film was not obtained.

EXAMPLE 1

Initially, 100.0 g of Teodur PE (manufactured by Kuboko Paint Co., Ltd.) which is the thermosetting resin powder and 10.0 g of PCF 7601 (manufactured by Toyo Aluminum K.K.) which is the resin coat aluminum powder were placed in a stainless beaker having a 1-liter volume, and mixed well by means of a spoon so as to obtain dry blend.

Thereafter, 2.0 g of a terpene/phenol-type hydrogenated resin (YS-Polyster TH-130 having the number-average molecular weight of 800 and the softening point of 130° C., manufactured by Yasuhara Chemical Co., Ltd.) as an adhesive binder was dissolved in 21.1 g of normal heptane (boiling point of 98.4° C.). The solution was added to the dry blend, and mixed and kneaded well by means of a spoon, so as to achieve a uniform state. After air-drying for approximately one hour while continuing mixing and kneading, powders so powdery as floating in the air were obtained.

The powders were placed in an eggplant-shaped flask of 1-liter volume, mixed while being rotated by means of an evaporator, and subjected to vacuum drying at a room temperature for 20 minutes. When a sample was observed, there was no aggregated mass present in the eggplant-shaped flask, and therefore, crushing was not performed. Here, 109.5 g of powders were obtained. The powders were put through a screen of 100 μm mesh, and 108.2 g of the powder coating composition was obtained (yield 96.6%).

The average particle size of the obtained powder coating composition based on D50 conversion was 46 μm, and the bonding ratio of the aluminum flake pigment in the powder coating composition was 98.4%.

Method of Measuring Average Particle Size of Powder Coating Particle Based on D50 Conversion

COMPARATIVE EXAMPLE 1, COMPARATIVE EXAMPLE 2, AND EXAMPLE 1

A mixture obtained by dispersing approximately 0.1 g of a sample in 5 g of 0.5% Triton X (a surfactant manufactured by Union Carbide Corporation) aqueous solution was dropped in Microtrac 9320X-200 manufactured by Honeywell using water as a solvent, which was dispersed with ultrasound (40 W, 10 seconds). Thereafter, the average particle size was measured.

COMPARATIVE EXAMPLE 3

Sieves of 840 μm mesh, 350 μm mesh, 149 μm mesh, 105 μm mesh, 63 μm mesh, and 44 μm mesh were stacked, and the average particle size based on D50 conversion was read based on cumulative weight particle size distribution of the powders obtained by classifying the same using a low-tap classifier.

Method of Measuring Content of Aluminum Flake Pigment

A certain amount of the prepared powder coating composition (herein also referred to as bonded aluminum) was collected, and thermosetting resin powders were dissolved and removed using N-methylpyrrolidone. Then, only aluminum flake pigment coated with the resin composition coat was extracted and its mass was measured, so as to calculate the content of the aluminum flake pigment in the bonded aluminum.

Method of Measuring Bonding Ratio (Bonding Rate)

(i) Principle in Measurement of Bonding Ratio

If the flake pigment is the aluminum flake pigment, the bonding ratio between the thermosetting resin powder and the aluminum flake pigment is obtained by quantitatively analyzing non-bonding aluminum flake pigment and subtracting the ratio of the same, as in the following equation.

Bonding Ratio (%)=100−Ratio of Non-Bonding Aluminum Flake Pigment (%)

In order to quantify the non-bonding aluminum flake pigment, the non-bonding aluminum flake pigment should be separated from the thermosetting resin powder bound to the aluminum flake pigment. In explaining a quantitative method, a principle in separation should initially be described.

According to this method, separation is carried out by utilizing a difference in a shape, that is, a flake and a particle. In other words, the aluminum flake pigment bound to particulate thermosetting resin powder is similarly particulate as a whole, because the aluminum flake pigment is formed as one piece with the thermosetting resin powder. On the other hand, the aluminum flake pigment not bound to the thermosetting resin powder remains as a flake (herein also referred to as free aluminum flake pigment).

The present separation method also utilizes difference in how readily a particulate substance and a flake substance adhere to a sheet surface. Specifically, contact between the sheet surface (flat surface) and the particulate substance is point contact and the particulate substance has a sufficient mass. Therefore, adhesion between the sheet surface and the particulate substance is less likely. On the other hand, the flake substance has a small volume and light weight, because it is a flake. In addition, contact between the sheet surface and the flake substance is surface contact. Therefore, adhesion between the sheet surface and the flake substance is more likely.

When a tested subject is uniformly spread on the sheet surface and the tested subject is dropped from the sheet surface, the flake substance that adheres thereto and the particulate substance that does not adhere thereto can be separated. The adhered aluminum flake pigment has a silver color. Therefore, the adhered free aluminum flake pigment can be quantified by measuring brightness of the sheet surface.

It is natural that all free aluminum flake pigments do not adhere to the sheet surface. Accordingly, a sample in which the content of the free aluminum flake pigment is already known is prepared, and the sample is analyzed with the method as above, so as to clarify a relation between the content of the free aluminum flake pigment and brightness of the sheet surface. A calibration curve is thus prepared. With the use of the calibration curve, the free aluminum flake pigment in the tested subject can be quantified based on brightness of the sheet surface. The specific method will be described below.

(ii) Preparation of Calibration Curve

In order to prepare the calibration curve, the thermosetting resin powder and the aluminum flake pigment the same as those in a raw material for the tested subject should be used. Then, the thermosetting resin powder and the aluminum flake pigment are dry-blended, so as to obtain several types of compositions. Here, the aluminum flake pigment has not bound to the thermosetting resin powder. Therefore, the original content of aluminum flake pigment is equal to the content of the free aluminum flake pigment.

Thereafter, a small amount of the tested subject for the calibration curve is placed on a sheet of black art paper, and uniformly spread with the use of a 9-mil doctor blade. Then, the paper is turned upside down so as to remove excessive tested subject for the calibration curve, followed by sufficiently tapping the edge of the paper with fingers. The art paper to which the free aluminum flake pigment and a small amount of particulate thermosetting resin powder adhere is thus obtained. This art paper is subjected to colorimetry with X-Rite, and the value of L15 is assumed to represent brightness. This operation is performed 5 to 10 times for each tested subject for the calibration curve of one sample, and the average of L15 is assumed as the brightness of the sample. As it has experimentally been found that the square root of the aluminum content (%) and the L15 value are linearly proportional, the relation therebetween is expressed as an equation, using the least squares method.

(iii) Specific Example of Measurement of Tested Subject and Calculation of Bonding Ratio Here, an example using PCF 7601 (manufactured by Toyo Aluminum K.K.) as the aluminum flake pigment and Teodur PE 785-900 (manufactured by Kuboko Paint Co., Ltd.) as the thermosetting resin powder is shown.

Figure 2:
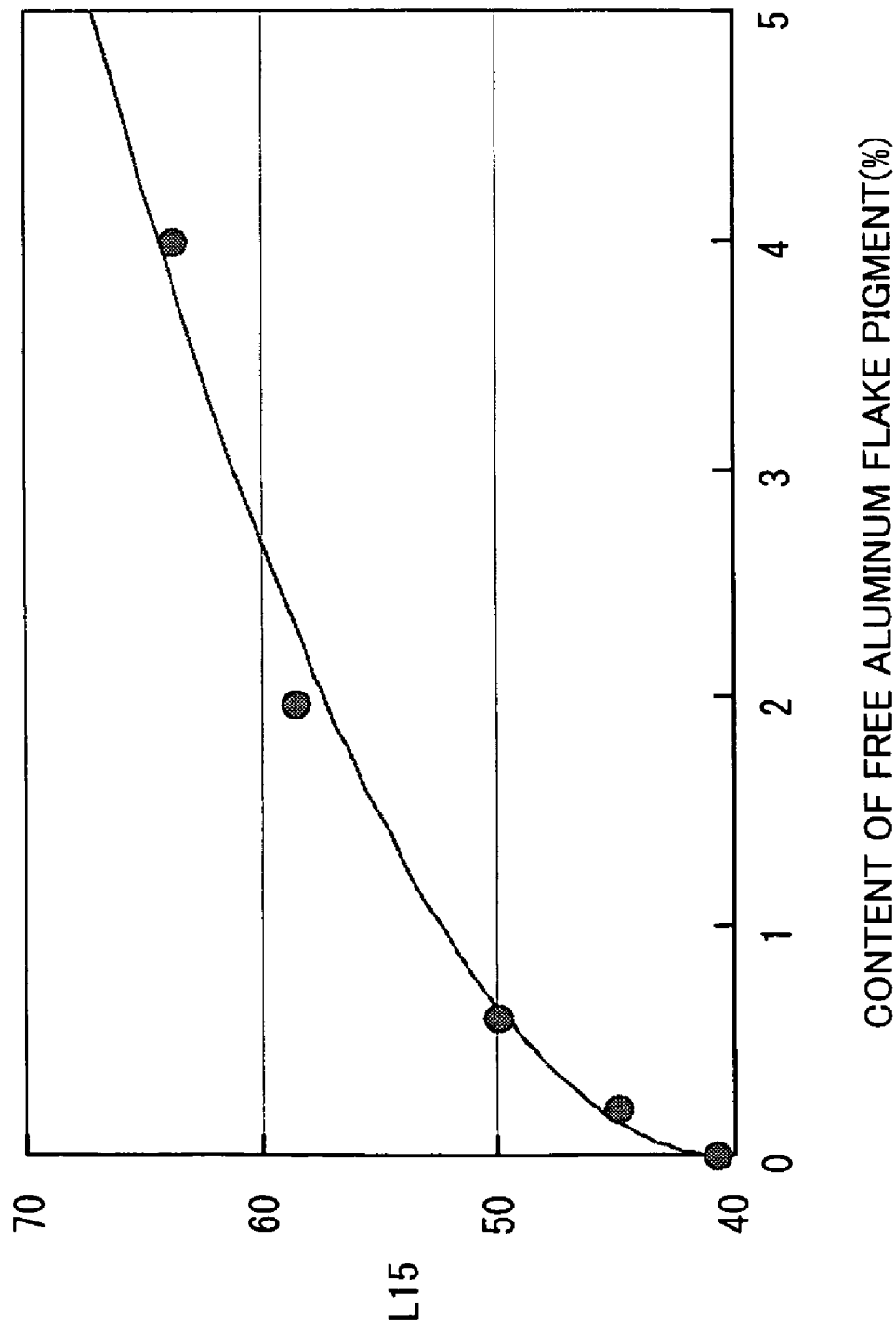
FIG. 2 is a graph illustrating a calibration curve showing a relation between the content of free aluminum flake pigment and brightness (L15).

Table 1 and FIG. 2 show a result of a plurality of times of measurement of the L15 value of the tested subject for the calibration curve of which bonding ratio is already known, so as to obtain an average. FIG. 2 is a graph illustrating the calibration curve showing a relation between the content of the free aluminum flake pigment and brightness (L15).

TABLE 1

Relation Between Content of Free Aluminum (%) and Average L15 Value

| Sample Number for Calibration Curve | Content of Free Aluminum (%) | Average L15 Value |
|---|---|---|
| 1 | 0.00 | 40.6 |
| 2 | 0.20 | 44.9 |
| 3 | 0.60 | 49.9 |
| 4 | 1.97 | 58.4 |
| 5 | 4.00 | 63.6 |

Based on the result as shown above, the following calibration curve was obtained.

Content of Free Aluminum Flake Pigment (%)= $((L15-40.23)/11.96)^2$

The tested subject of which bonding ratio is unknown is measured in an operation the same as that in preparing the calibration curve, so as to obtain L15. By substituting the obtained value into the above equation for the calibration curve, the content of the free aluminum flake pigment is calculated. For example, when L15=60, L15=60 is substituted into the equation above obtained as the calibration curve. Then, the content of the free aluminum flake pigment (%) is equal to 2.7%.

The ratio (%) of the non-bonding aluminum flake pigment can be obtained as a product of the content of the free aluminum flake pigment (%) and the actually measured content of the aluminum flake pigment (%). If the actually measured content of the aluminum flake pigment is 8.9%, 2.7% of that content is the content of the free aluminum flake pigment. Therefore, the ratio of the free aluminum flake pigment is calculated as follows: 2.7/8.9×100=30%. Accordingly, the bonding ratio is calculated as follows: bonding ratio=100−30=70%. This method is particularly accurate in a high bonding ratio region where the calibration curve is steep.

Evaluation Result

Table 2 summarizes a blended amount and a yield of a variety of components in preparing the powder coating compositions obtained in Comparative Examples 1 to 3 and Example 1. Table 2 also summarizes a result of analysis of aluminum content (mass %) and bonding ratio (%) of these powder coating compositions.

TABLE 2

Blended Amount, Result of Property Analysis, etc. of Powder Coating Composition

| Powder Coating Composition | | | Comparative Example 1 | Comparative Example 2 | Comparative Example 3 | Example 1 |
|---|---|---|---|---|---|---|
| Blended Amount | Aluminum Flake Pigment | Type | | PCF 7601 | | |
| | | Average D50 (μm) | | 31.9 | | |
| | | Amount (g) | 5 | | 5 | 10 |
| | | Amount of Resin Coat (g/100 g Al) | | 28 | | |
| | Resin Powder | Type of Resin | | Polyester | | |
| | | Amount (g) | 50 | | 50 | 100 |
| | Tackifier | Type | — | Teodur PE | — | TH-130 |
| | | Amount (g) | — | 0.25 | — | 2 |
| | Solvent | Type | Acetone | Dichloromethane | Acetone/n-Heptane | n-Heptane |
| | | Amount (g) | 1.5 | 1.25 | 3/30 | 21.1 |
| Result of Property Analysis | Yield (%) | | 85.0 | 88.0 | 100 | 96.6 |
| | Bonding Ratio (%) | | 21.0 | 2.0 | Measurement not available | 98.4 |
| | D50 of Powder Coating Particle (μm) | | 49.0 | 32.0 | 230 | 46.0 |
| | Content of Aluminum Flake Pigment (weight %) | | 9.0 | 8.9 | 9.1 | 8.4 |
| | Adhesiveness to Nozzle | | Yes | Yes | *1 | No |
| | Brightness of Coating Film (β/α) | | 164.7 | 168.0 | *1 | 176.5 |
| | Observation by Electron Microscope | | X | X | *1 | ◎ |

*1: Measurement was not available, because a large number of seedings were formed in the coating film and smooth coating film was not obtained.

Here, as can be seen from the result shown in Table 2, the samples to be compared have substantially the same aluminum content. Therefore, the result of comparison of properties represented by brightness of the coating film based on these powder coating compositions which will be described later can be assumed as comparison of effects of the present invention.

The powder coating compositions in Comparative Example 1, Comparative Example 2, and Example 1 were applied using a corona discharge electrostatic powder coating apparatus (product name "MXR-100VT-mini" manufactured by Asahi Sunac Corporation) at an application voltage of 80 kV, respectively. Thereafter, a plate was prepared by baking at 190° C. for 20 minutes. Table 2 shows the brightness of the coating film (β/α).

As can be seen in Table 2, the plate using the powder coating composition according to Example 1 of the present invention has brightness (β/α) higher than the plate using the powder coating compositions according to Comparative Example 1 and Comparative Example 2. When adhesion to the nozzle is compared, the powder coating composition according to Example 1 attains better coating property than the powder coating compositions according to Comparative Example 1 and Comparative Example 2.

Micrographs in FIGS. 3 to 5 show results of observation of the powder coating compositions obtained in Comparative Example 1, Comparative Example 2, and Example 1, using an electron microscope.

In respective micrographs, a substance that looks like a lump is the thermosetting resin powder, and a substance that looks like a scale is the aluminum flake pigment. Among the aluminum flake pigments, those which appear to be apart from the thermosetting resin powders are the free aluminum flake pigments.

In the micrographs shown in FIGS. 3 to 5, a large amount of free aluminum flake pigment was observed in Comparative Example 1 and Comparative Example 2, whereas the free aluminum flake pigment was not observed in Example 1.

Results of observation with an electron microscope are summarized in Table 2. A scanning electron microscope (SEM) was used to observe 10 or more fields of view for each Example and Comparative Example, and Table 2 shows results by denoting an example where free aluminum flake pigment was hardly observed by ◎, an example where some free aluminum flake pigment was observed by ○, an example where considerable free aluminum flake pigment was observed by Δ, and an example where a very large amount of free aluminum flake pigment was observed by x.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

As can clearly be seen from the results shown above, the powder coating composition according to the present invention is manufactured by binding the flake pigment onto the surface of the resin powder using the adhesive binder while being mixed and kneaded under a reduced pressure, followed by removal of the solvent.

Therefore, as an aggregated mass is not produced during manufacture of the powder coating composition according to the present invention, subsequent crushing for improving coating property by making smaller the average particle size of the powder particles for use as the powder coating composition is not necessary.

Accordingly, application of external force for breaking bonding between the flake pigment and the thermosetting resin powder is not necessary during manufacture of the powder coating composition according to the present invention.

Therefore, the average particle size of the powder coating particle contained in the powder coating composition according to the present invention is sufficiently small and bonding between the flake pigment and the thermosetting resin powder contained in the powder coating composition is extremely strong, whereby the bonding ratio is remarkably high.

Therefore, the powder coating composition according to the present invention is a powder coating composition containing a flake pigment attaining excellent recyclability and coating property as well as improved metallic feel, brilliance and brightness of a coating film.

The invention claimed is:

1. A powder coating composition, comprising:
    powder coating particle including thermosetting resin powder, an adhesive binder, and a flake pigment bound to a surface of said thermosetting resin powder by means of said binder;
    wherein said powder coating particle has an average particle size of at most 100 μm based on D50 conversion,
    a bonding ratio between said thermosetting resin powder and said flake pigment is in a range from 90% to 100%, and
    said adhesive binder is of at least one selected from the group consisting of terpene resins, terpene/phenol resins, terpene hydrogenated resins, and terpene/phenol hydrogenated resins.

2. The powder coating composition according to claim 1, wherein
    said flake pigment is an aluminum flake pigment including aluminum flake particle and a resin composition coat coating a surface of said aluminum flake particle.

3. The powder coating composition according to claim 2, wherein
    said resin composition coat is a resin composition coat containing a three-dimensionally cross-linked polymer resin obtained by polymerizing a raw material composition including at least two types of oligomer and/or monomer having at least one polymeric double bond in a molecule.

4. The powder coating composition according to claim 3, wherein
    said aluminum flake pigment contains 2 g to 50 g of said resin composition coat with respect to 100 g of said aluminum flake particle.

5. The powder coating composition according to claim 1, wherein
    said adhesive binder is an oligomer that can be dissolved in a solvent that does not dissolve said thermosetting resin powder, has a number-average molecular weight in a range from 300 to 2000, and has a softening point in a range from 30 to 180° C., and
    said solvent that does not dissolve said thermosetting resin powder has a boiling point in a range from 28 to 130° C. under an atmospheric pressure.

* * * * *